United States Patent [19]

Sakuma et al.

[11] Patent Number: 5,029,052
[45] Date of Patent: Jul. 2, 1991

[54] VANITY MIRROR WITH LAMP

[75] Inventors: Toranosuke Sakuma; Yoshihide Yoshida, both of Shizuoka, Japan

[73] Assignee: Koito Seisakusho Co., Ltd., Tokyo, Japan

[21] Appl. No.: 406,857

[22] Filed: Sep. 13, 1989

Related U.S. Application Data

[63] Continuation of Ser. No. 169,398, Mar. 17, 1988, abandoned.

[30] Foreign Application Priority Data

Mar. 19, 1987 [JP] Japan .................... 62-65487

[51] Int. Cl.$^5$ .............................................. B60Q 1/00
[52] U.S. Cl. ........................................ 362/74; 362/144; 296/97.5
[58] Field of Search ............... 362/61, 74, 80, 135, 362/142, 144; 296/96.1, 96.5

[56] References Cited

U.S. PATENT DOCUMENTS

| | | | |
|---|---|---|---|
| 4,075,468 | 2/1978 | Marcus | 362/144 |
| 4,174,864 | 11/1979 | Viertel et al. | 296/97 H |
| 4,227,242 | 10/1980 | Marcus | 362/74 X |
| 4,364,597 | 12/1982 | Viertel et al. | 362/137 X |
| 4,479,172 | 10/1984 | Connor | 362/135 |
| 4,591,956 | 5/1986 | Majchrzak | 362/135 X |
| 4,683,522 | 7/1987 | Viertel et al. | 362/137 X |
| 4,764,852 | 8/1988 | Sakuma | 362/135 |

FOREIGN PATENT DOCUMENTS 0230269 1/1987 European Pat. Off. .............. 362/74

Primary Examiner—Stephen F. Husar
Assistant Examiner—D. M. Cox
Attorney, Agent, or Firm—Koda and Androlia

[57] ABSTRACT

A vanity mirror for mounting in a vehicle sun visor including a housing and an external connector provided in the sun visor, a lamp section including a tubular electric lamp provided in a recess formed in the housing and an internal connector provided in the housing. Two contact members for supporting the bases on both sides of the electric lamp are provided and the end of one extremity of these contact members are formed into electric lamp supporting portions. The other end of at least one of these contact members is made into a connecting piece for connecting the external connector thereto. Also, the internal connector is formed by placing a connecting piece connected to the other end of the other contact member in parallel with the connecting piece of the first contact. With this construction use of vehicle as a ground is avoided so that the supporting structure of the mirror with the lamp may be formed of a nonmetallic lightweight material. Also, with the internal connector, complex wiring and body manufacture are avoided, simplifying the work required to mount the mirror with the lamp to the vehicle body.

6 Claims, 12 Drawing Sheets

FIG. II
PRIOR ART

VANITY MIRROR WITH LAMP

This is a continuation of application Ser. No. 169,398, filed Mar. 17, 1988, now abandoned.

BACKGROUND OF THE INVENTION

1. Field of the Invention

The present invention relates to a vanity mirror with lamp, and particularly to a vanity mirror with lamp that is attached to the sun visor for a vehicle.

2. Description of the Prior Art

Among vanity mirrors with lamps mounted to sun visors provided in driver compartments of vehicles, there are those employing the vehicle body as a ground in order to limit the number of wires for each vanity mirror with lamp.

FIGS. 11 through 13 show an example of such a prior art vanity mirror with lamp assembly.

In FIGS. 11 and 12 a sun visor with peripheral frame b made of conductive material is covered with a padding material c. Mounting bracket d also made of conductive material is combined with frame b.

Vanity mirror with lamp e comprises a lamp section g next to mirror f. The lamp section g includes a tubular electric lamp j disposed in a recessed area i formed in a body h, with a lens k covering its front surface.

Combined with frame b are supporting brackets l also made of conductive material, which support the lamp section g by means of screws m.

When a supporting member (not shown in FIG. 12) for supporting base n1 on one side of the afore-mentioned tubular electric lamp j is made of a conductive material and tightly fastened together with the supporting bracket l to the body h by the screw m which is conductive, the base n1 on one side of the tubular electric lamp j becomes grounded to the vehicle body structure to which the mounting bracket d is installed via the supporting member (not shown in the Figure), the screw m, the supporting bracket l, the frame b and the mounting bracket d.

In FIG. 13 the power source o is connected through a lead wire (not shown in the Figure) to a base n2 on the other side of the tubular electric lamp j, forming a circuit. Switch p is designed to open when cover q is closed, and to close when cover q is opened.

In recent years it has become desirable to reduce the weight of the sun visor by changing the material. For example, the material for the supporting brackets l has been changed from metal to synthetic resin. In this case a vehicle body ground cannot be employed and two wires (one for the power supply and one for the ground) must be provided for the lamp section.

It is troublesome to put these wires together during storage and transportation. In addition, at the time the vehicle body is assembled, the two wires must be connected to corresponding wires on the vehicle body side. Thus, it is not only cumbersome to have to connect these two wires, but the parts which are to be connected are mounted near the ceiling in a narrow compartment of the vehicle in which it is extremely difficult to work.

SUMMARY OF THE INVENTION

Accordingly, it is a general object of the present invention to solve the abovementioned problems.

It is another object of this invention to provide a vanity mirror with lamp in which the lighting circuitry does not use the vehicle body as a ground.

It is still another object of this invention to provide a vanity mirror with lamp that is lightweight and also has a simple structure.

It is yet another object of the present invention wherein the installation, storage and transfer of the vanity mirror can be simplified.

The vanity mirror with lamp according to this invention achieves the abovementioned objects as follows. In the recessed area adjacent the mirror there are two contact members for supporting the bases provided on both ends of the tubular electric lamp. One end of each of these contact members forms one of the electric lamp supports. The other end of at least one of the contact members is made into a connecting piece to which the external connector is connected. The connecting piece connected to the other end of the other contact member is placed in parallel with the connecting piece of the first contact member described above to form an internal connector.

Thus, in the vanity mirror with lamp according to this invention it is unnecessary to use the vehicle body as a ground. As a result, it becomes unnecessary to use a conductive material for the supporting brackets. This, in turn, makes it possible to form most of the assembly structure of the sun visor from a lightweight material such as a synthetic resin which reduces the combined weight of the sun visor and vanity mirror and lamp assembly. Also, since an internal connector is provided, hanging wires for the power supply and for grounding are avoided, thereby eliminating handling problems during the maintenance, storage and transportation. Furthermore, connection to the power source can be made merely by connecting the external connector to the internal connector. Therefore, the work required to mount the vanity mirror to the vehicle body can be simplified substantially.

DETAILED DESCRIPTION OF THE INVENTION

Figure 1:
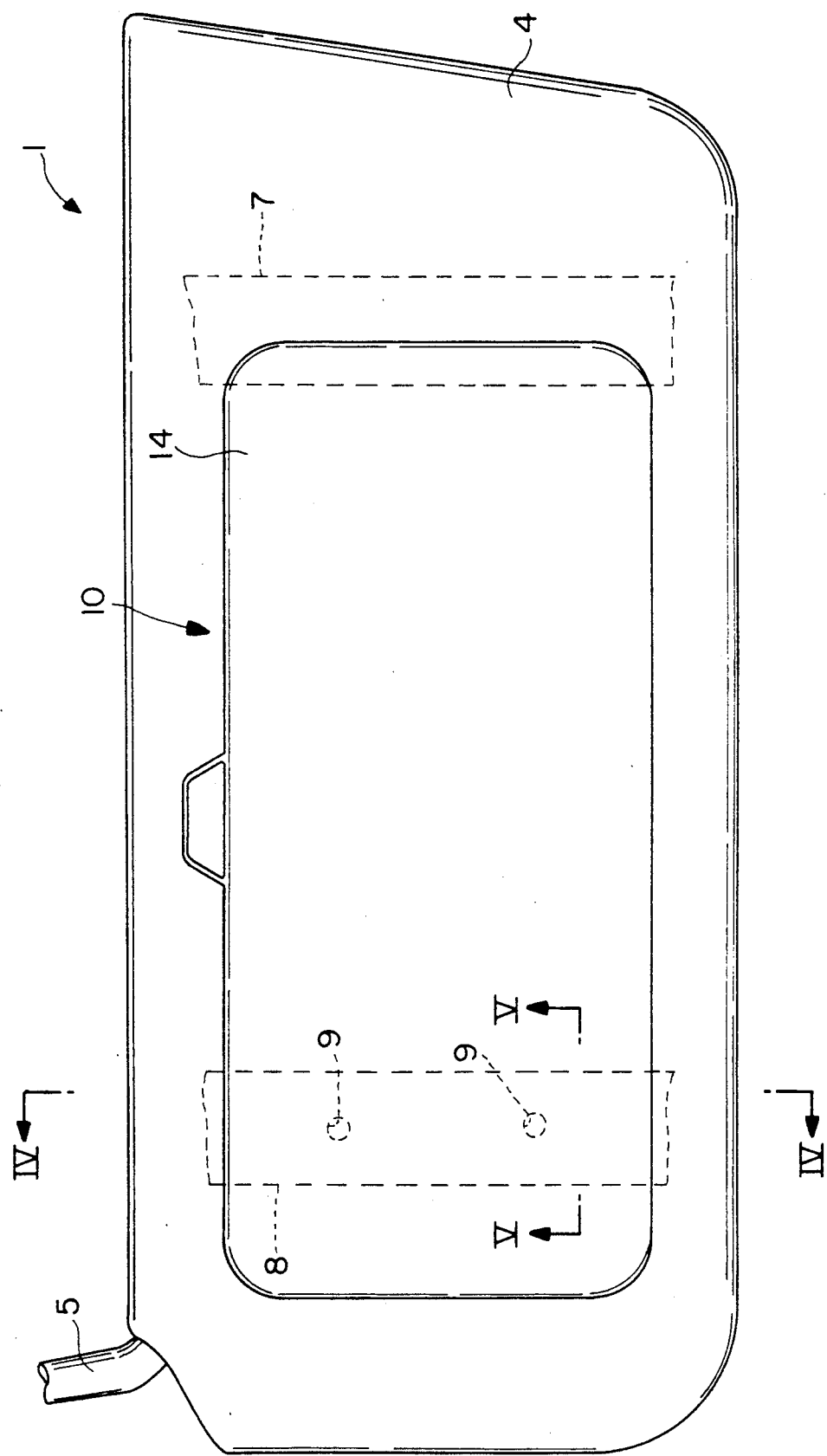
FIG. 1 is a front view of the vanity mirror with lamp according to the present invention in which the cover mounted to the sun visor is closed.
Figure 2:
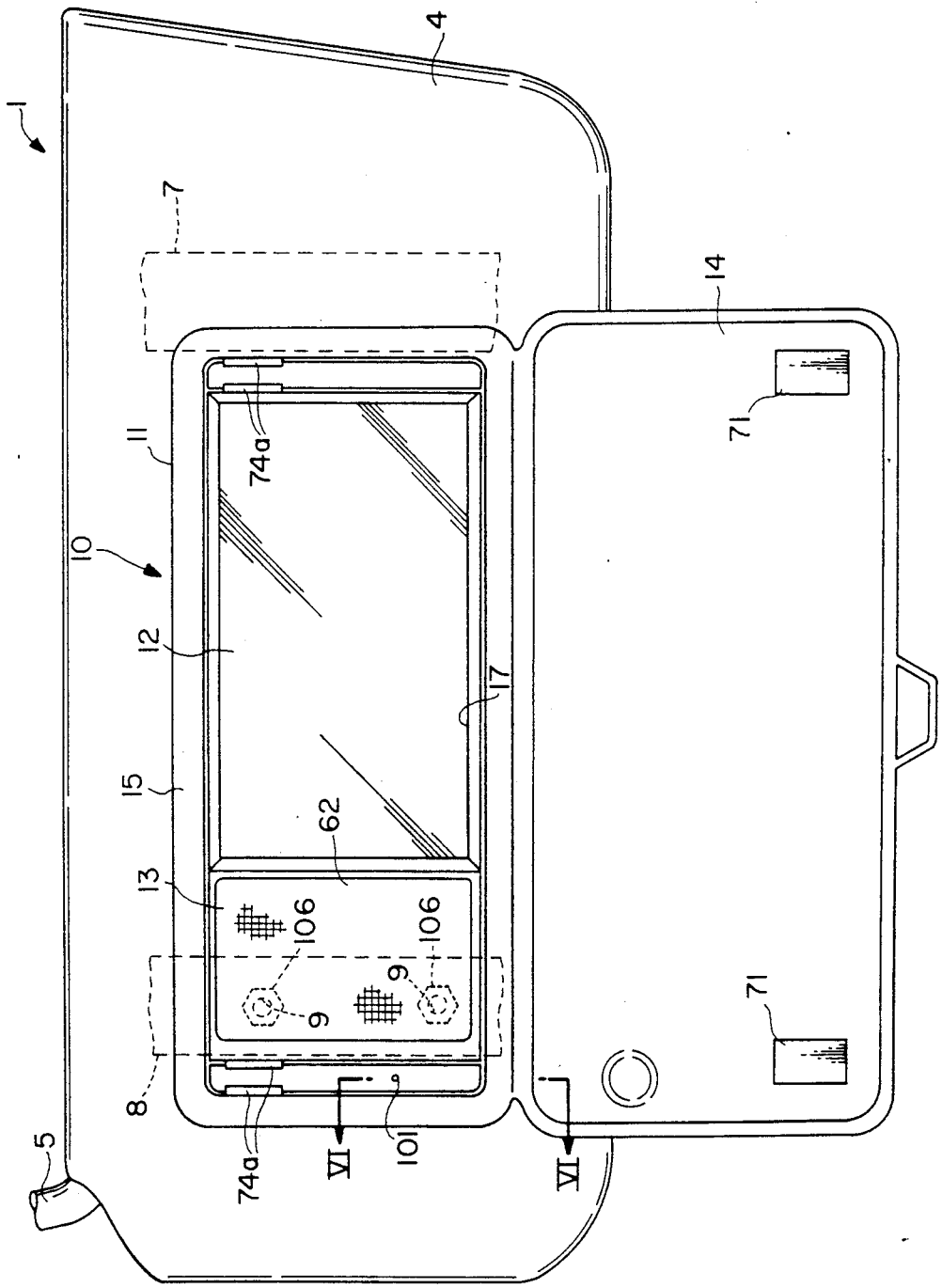
FIG. 2 is a front view of the mirror of FIG. 1 in which the cover mounted to the sun visor is opened.
Figure 3:
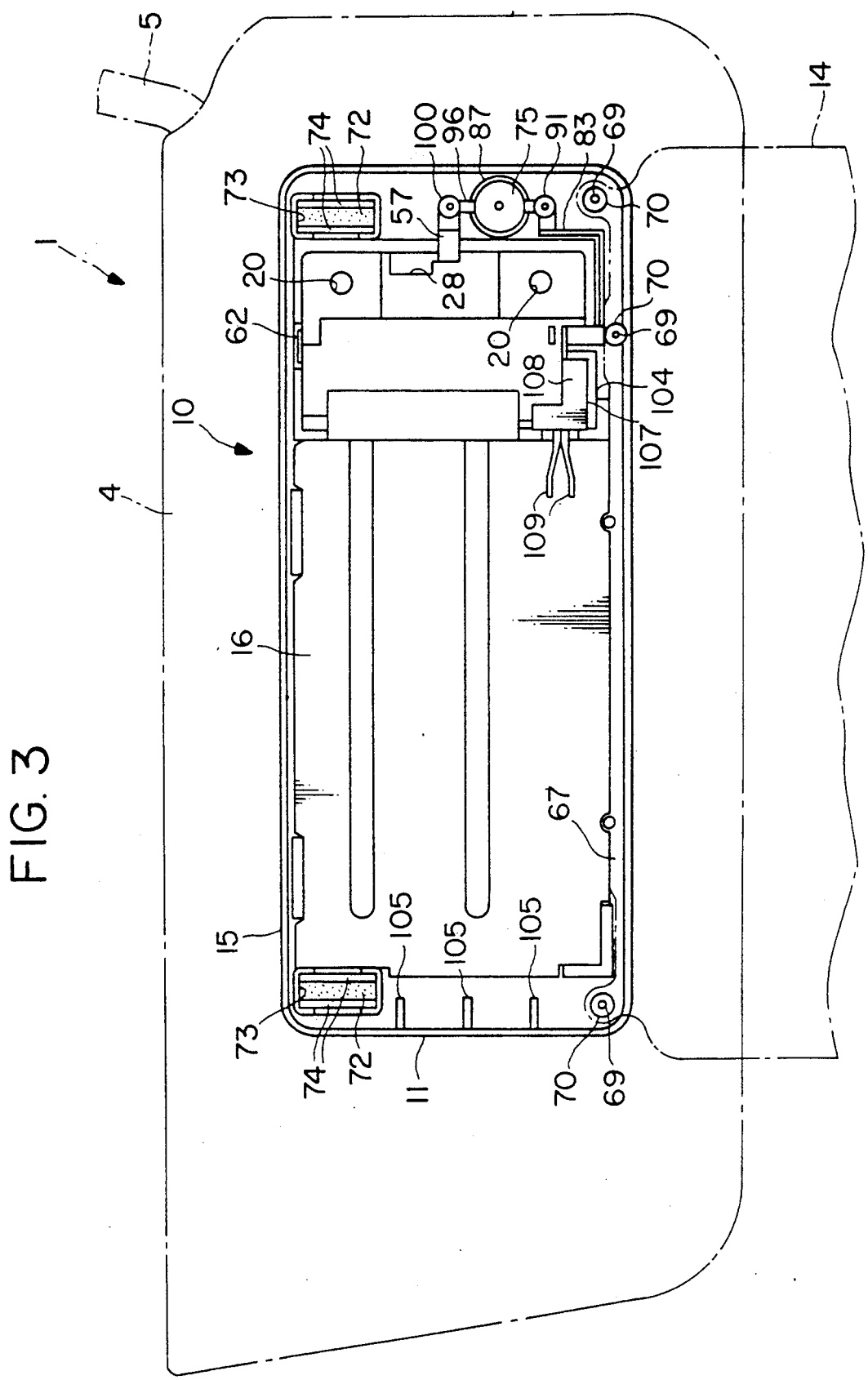
FIG. 3 is a rear view of the mirror of FIG. 1.
Figure 4:
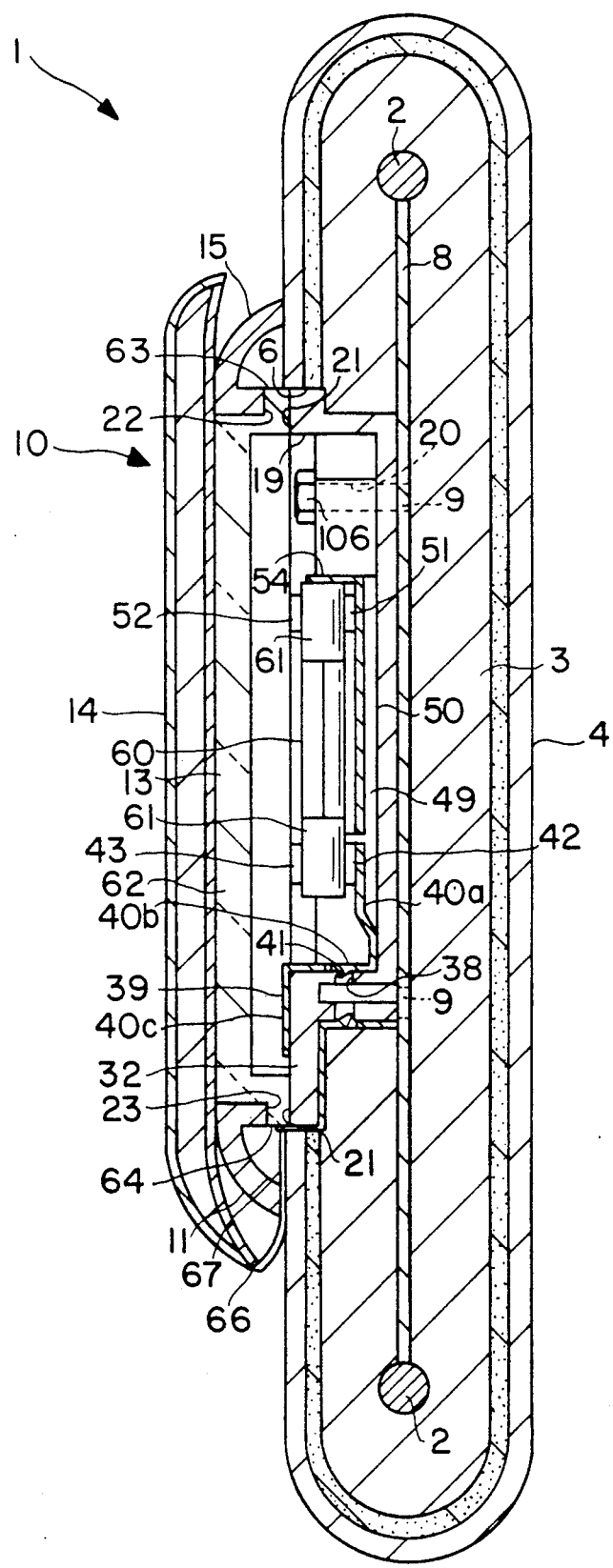
FIG. 4 is an enlarged sectional view taken along the line IV—IV in FIG. 1.
Figure 5:
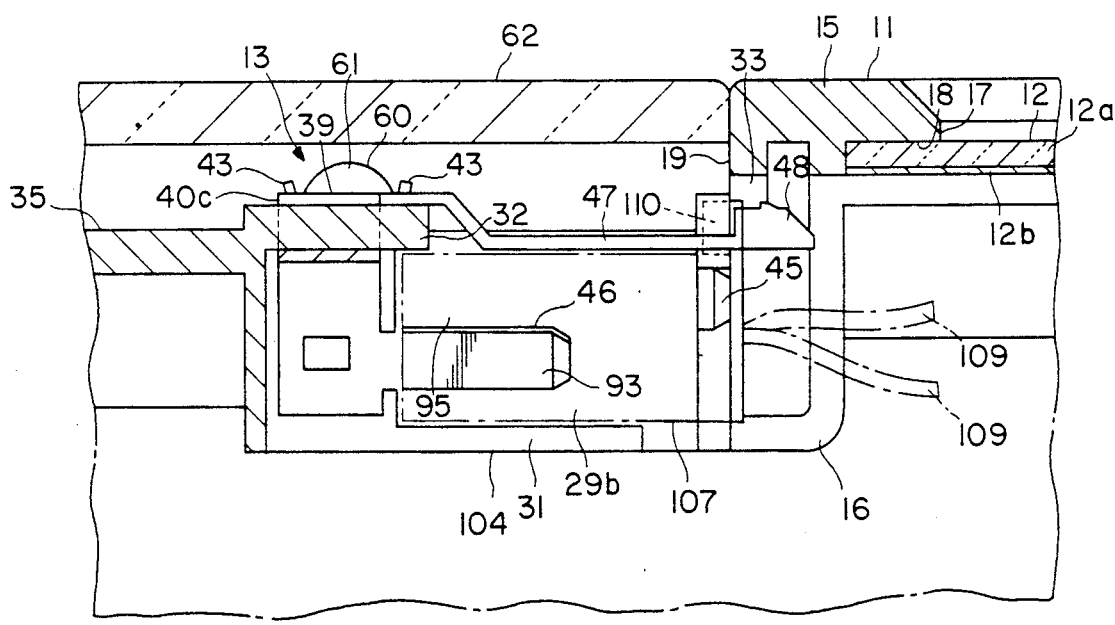
FIG. 5 is an enlarged sectional view taken along the line V—V in FIG. 1.
Figure 6:
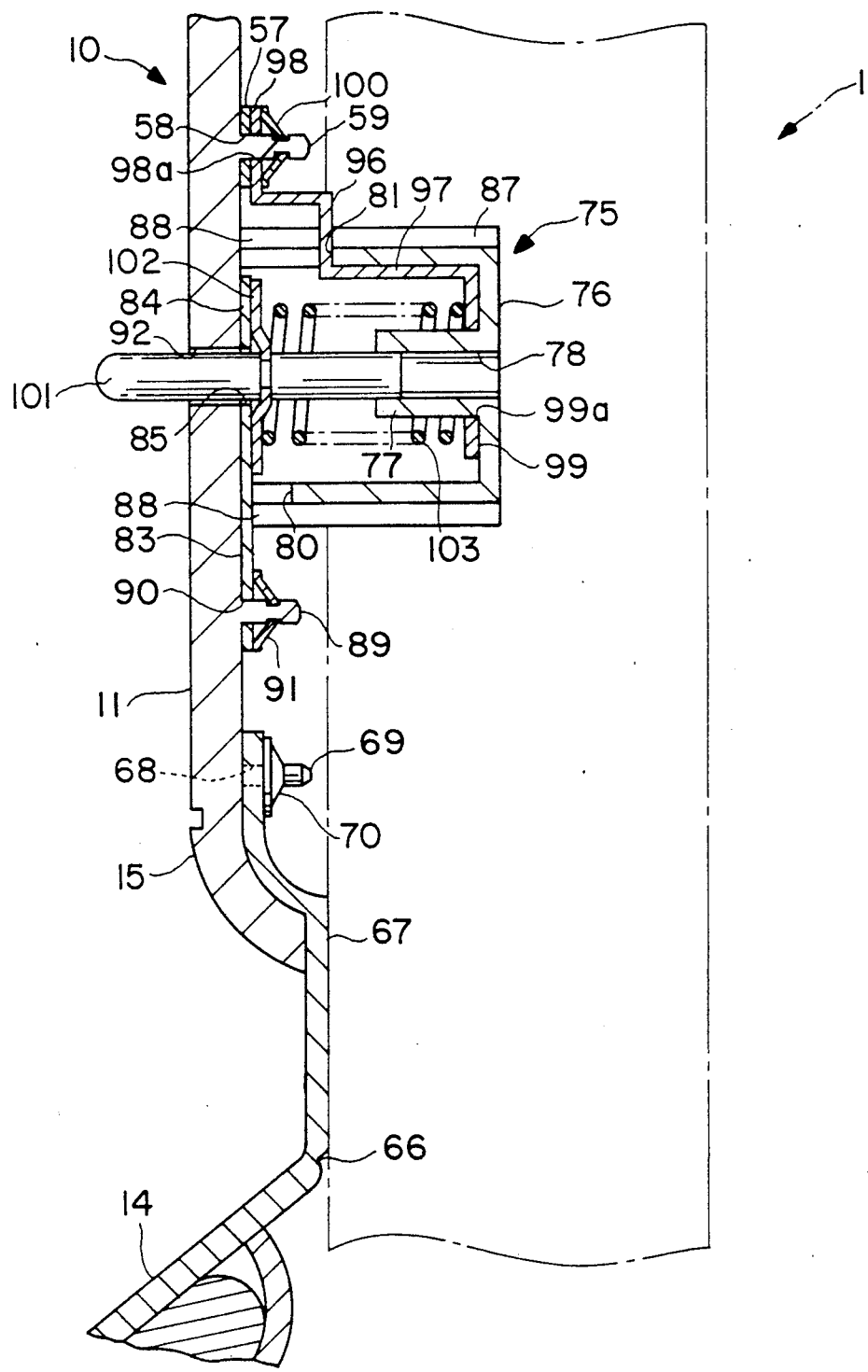
FIG. 6 is an enlarged sectional view taken along the line VI—VI in FIG. 2.
Figure 7:
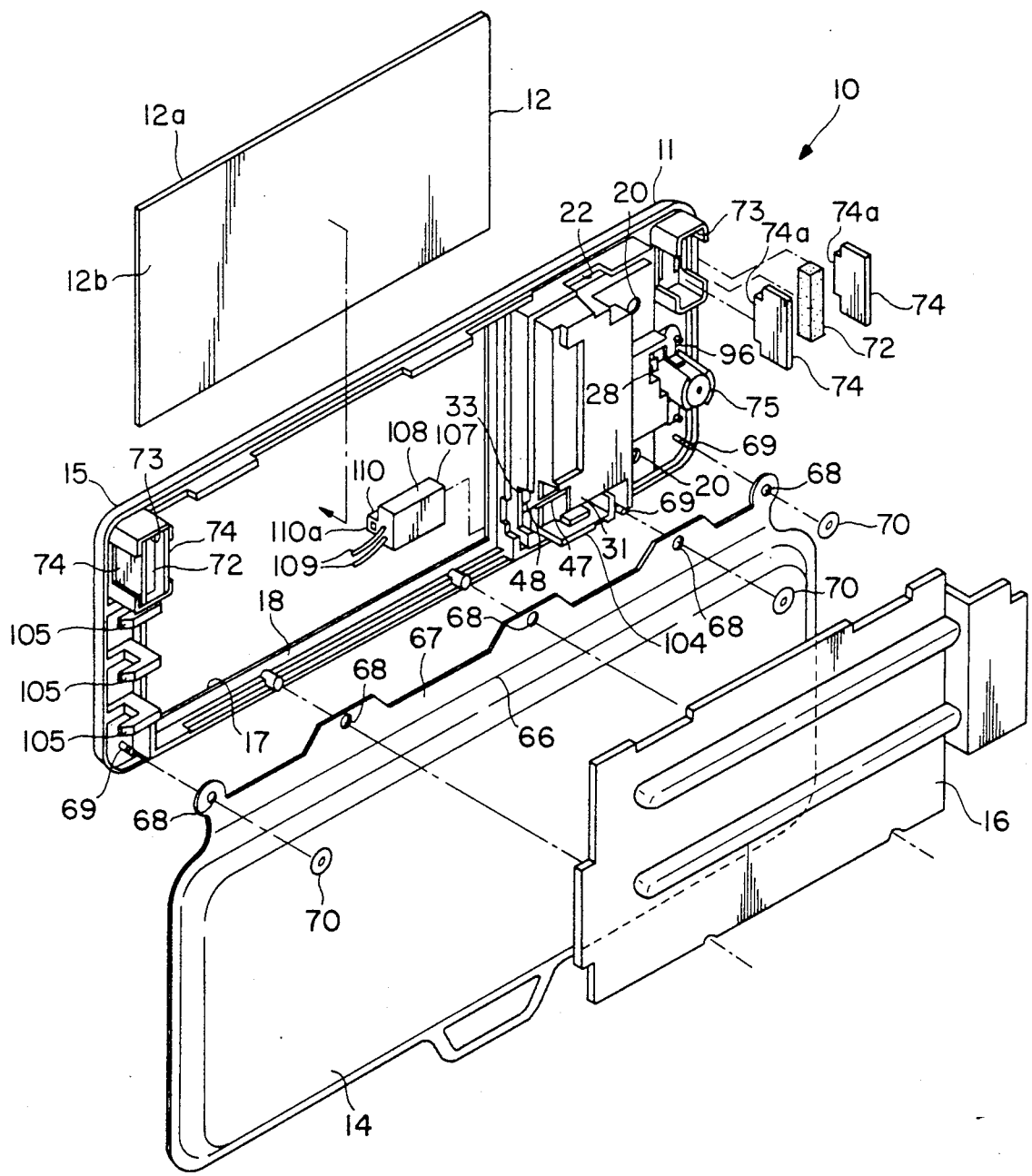
FIG. 7 is an exploded perspective view of the mirror of FIG. 1 seen from the rear.
Figure 8:
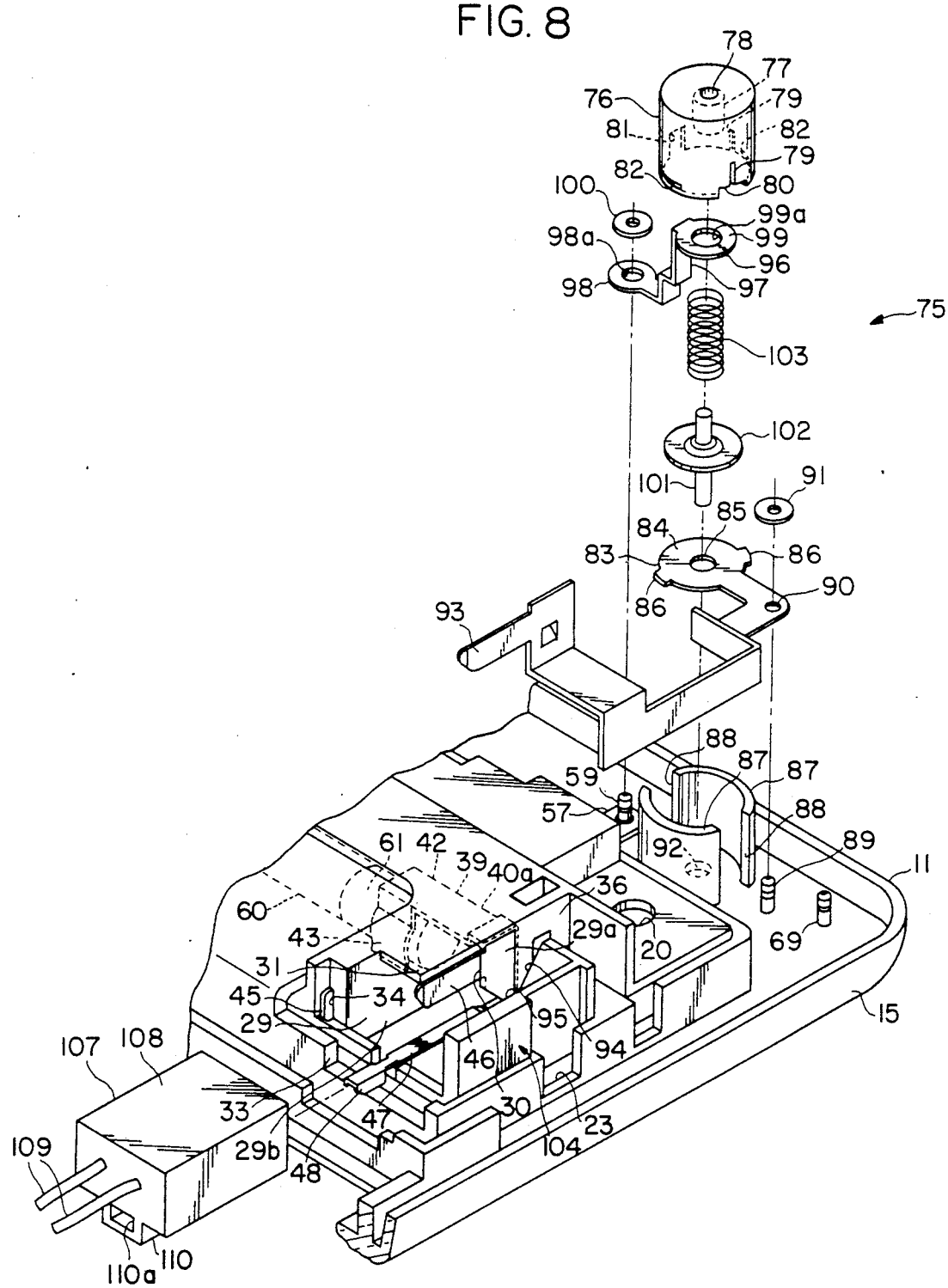
FIG. 8 is an enlarged exploded perspective view of the mirror of FIG. 1 showing the essential portions.
Figure 9:
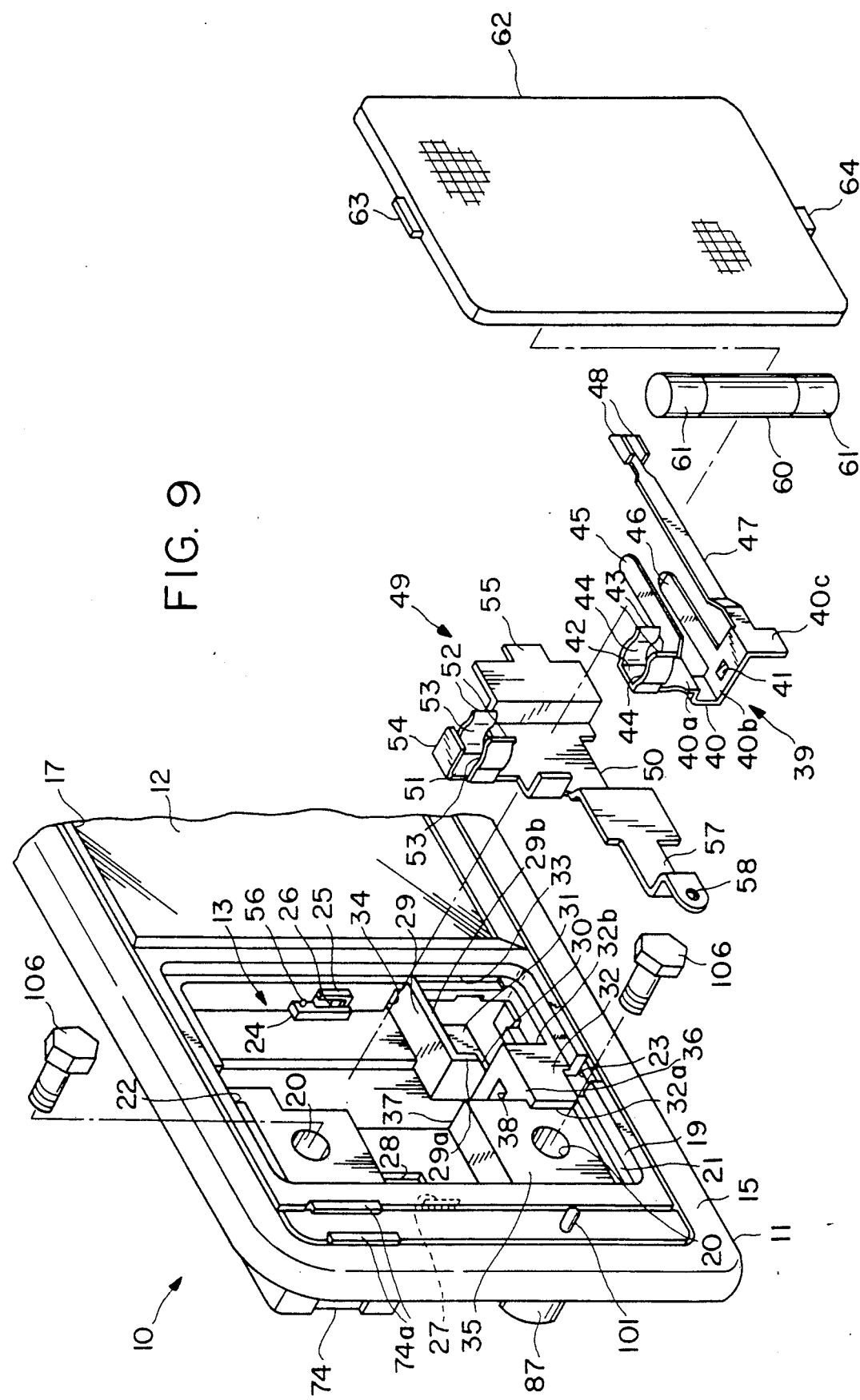
FIG. 9 is an enlarged exploded perspective view of the mirror of FIG. 1 showing other essential portions.
Figure 10:
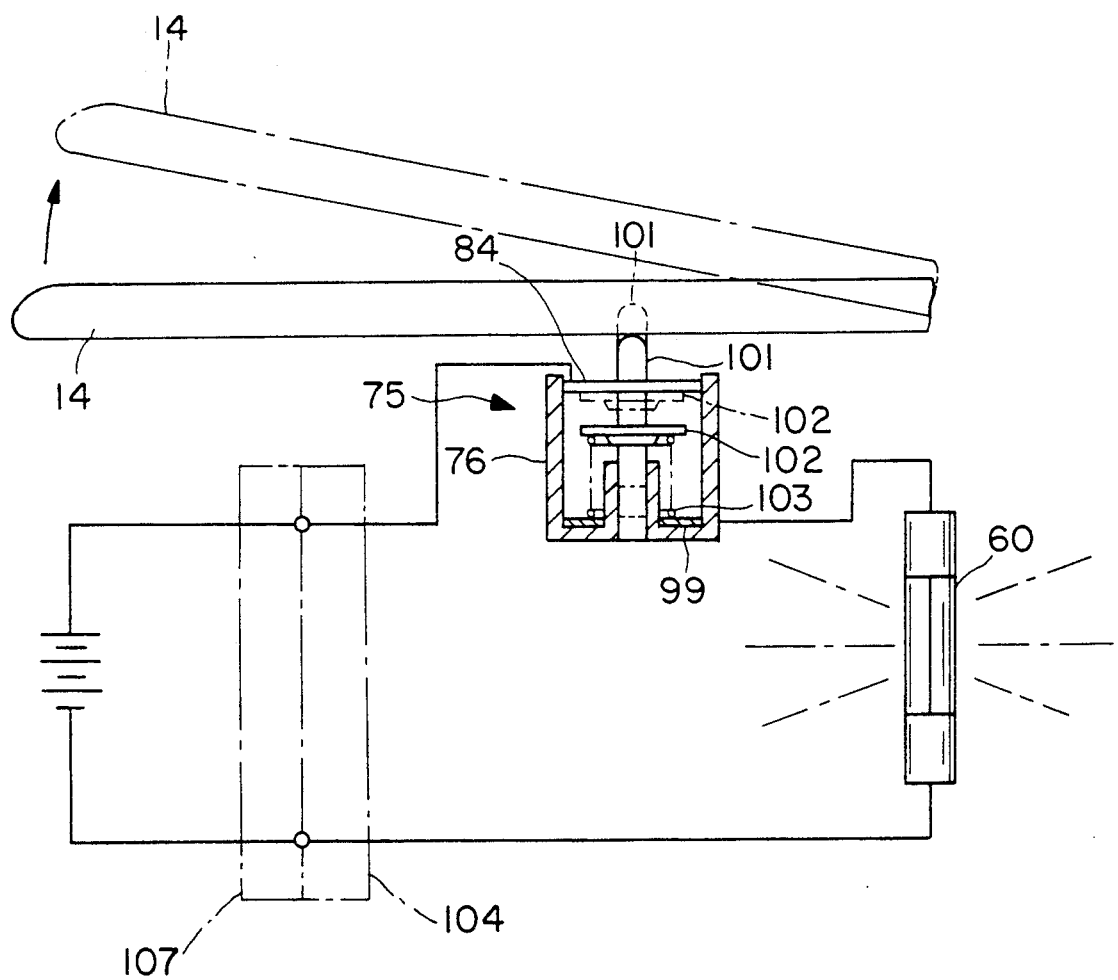
FIG. 10 is a circuit diagram of the mirror of FIG. 1.
Figure 11:
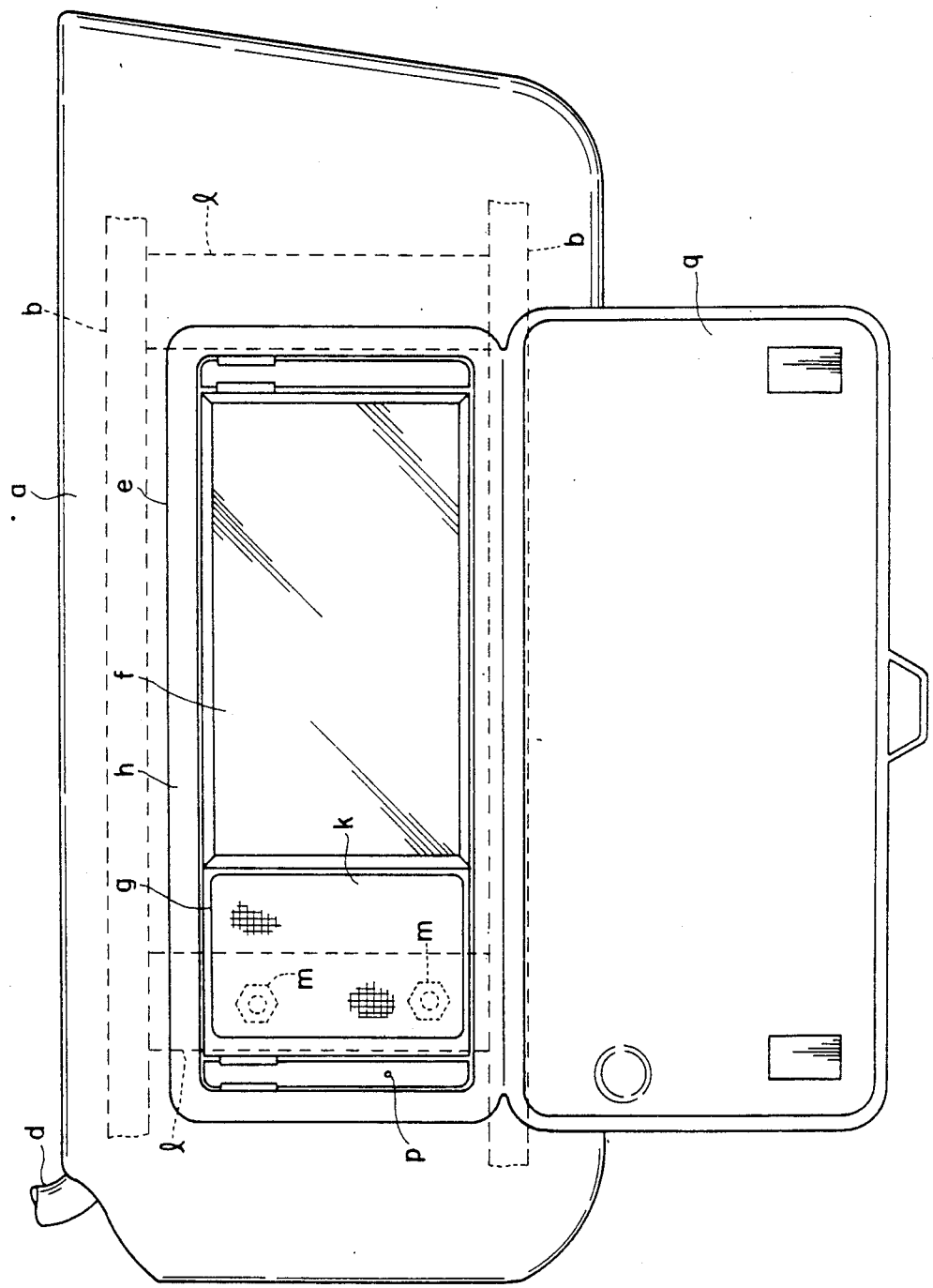
FIG. 11 is a front view of a conventional vanity mirror with lamp mounted to a sun visor in which the cover is opened.
Figure 12:
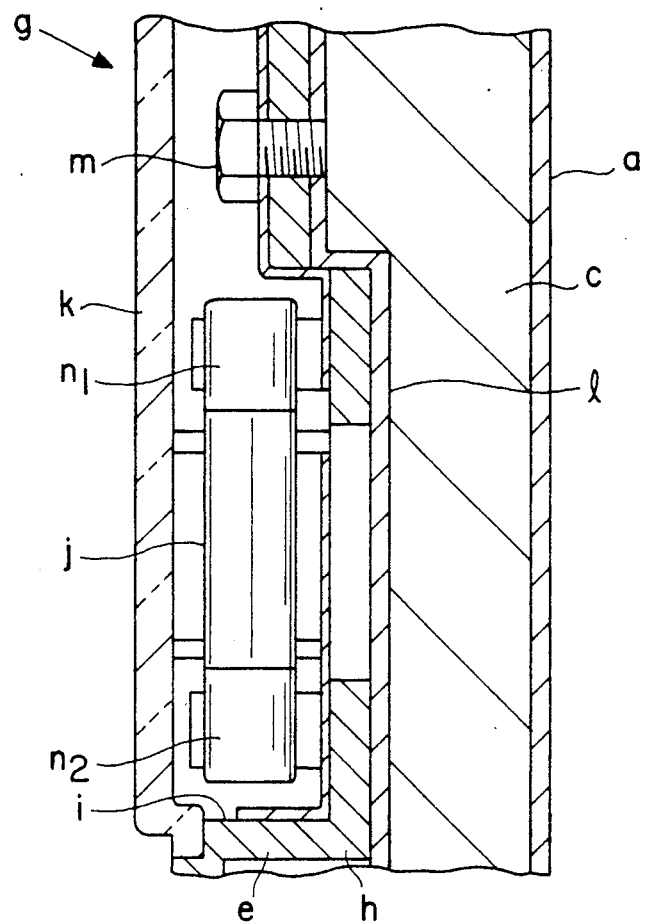
FIG. 12 is an enlarged sectional view of the mirror with lamp FIG. 11 showing the essential parts.
Figure 13:
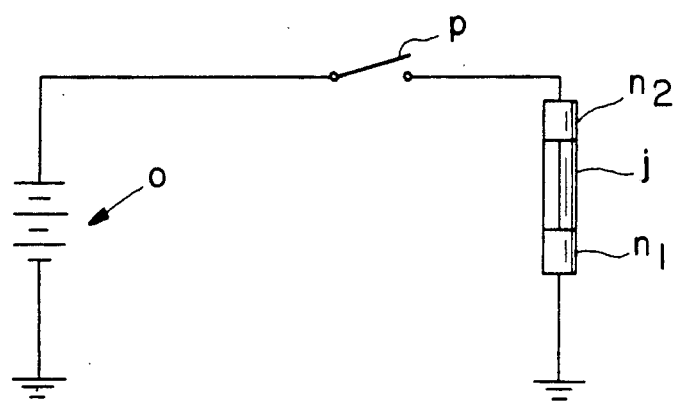
FIG. 13 is a circuit diagram of the mirror with of FIG. 11.

Hereunder, a detailed description of the vanity mirror with lamp according to this invention will be provided with reference to the embodiment shown in the drawings.

The vanity mirror of this invention includes a sun visor 1 having a structure known in the art. For example, the periphery of a framing material 2 is covered with cushioning material 3, and the outside is covered with sheet material 4. The upper portion of visor 1 is mounted rotatably to a position on the ceiling surface of the driver compartment of a vehicle that corresponds to the upper area of the windshield by means of a supporting shaft 5.

Sun visor 1 is provided with a recessed area 6 opening to the front side, that is, the side which comes to face the driver when the sun visor 1 is rotated downward and positioned to shield the driver's eyes from outside light, such as the rays of the sun. This recessed area 6 is shaped substantially rectangular with the transverse sides longer than the longitudinal sides.

Supporting brackets 7 and 8 form a part of the framing material 2 that constitutes the skeleton of the sun visor. A part of each of the supporting brackets 7 and 8 is positioned at a location closer to each of the right and left sides behind the rear part of the recessed area 6 so as to extend in the vertical direction. Also, in the supporting bracket 8, in the portion corresponding to the recessed area 6, two tapped holes 9 are formed apart from each other in the vertical direction.

Vanity mirror 10 is installed in the aforementioned recessed area 6 formed in the sun visor 1.

The vanity mirror 10 includes a mirror body 11 made of synthetic resin which holds a mirror 12 and a lamp section 13 adjacent to the mirror 12. A cover 14 opens and closes the front faces of the mirror 12 and lamp section 13.

The mirror body 11 is formed of a front frame 15 and a back cover 16 for covering the rear face of the mirror mounting section of the aforementioned front frame 15, which are all made of synthetic resin.

The front frame 15 is shaped substantially rectangular having longer transverse sides compared to the longitudinal sides. In the right side portion of the front frame 15, a through window 17 is formed, and along the opening edge of this through window 17 a backward facing stepped portion 18 is formed.

The mirror 12 is formed of a transparent base body 12a made of transparent synthetic resin, with a reflecting layer 12b provided on the back of the transparent base body 12a. This reflecting layer 12b is formed by, for example, vacuum evaporation of aluminum. The peripheral edge of the transparent base body 12a is mounted to the stepped portion 18 from behind; then, a back cover 16 is placed on the backside of the front frame 15 and bonded to the front frame 15 so as to cover the backside of the mirror 12 by appropriate means such as adhesion or thermal fusion. In this manner, the mirror 12 is supported by the front frame 15.

A recessed area 19 for the lamp section 13 is formed on the left side of the through window 17 and adjacent to it. This recess is opened to the front by protruding a part of the front frame 15 to the rear. Also, in the bottom wall of the recessed area 19, in the portion close to the left side, inserting through holes 20 are formed apart from each other in the vertical direction.

Along the opening edge of the recessed area 19, a stepped portion 21 for mounting the lens 62 is formed facing the front. Also, in the side walls of the upper side and the lower side of the stepped portion 21, at the center positions of those upper and lower sides, which correspond to each other, engaging recesses 22 and 23 are formed.

A rack-like portion 24 protrudes from close to the center portion in the vertical direction of the inner surface of the right side wall of the recessed area 19. A projecting piece 25 is formed on the right side wall of the recessed area 19 to face the front surface of the rack-like portion 24, at a position in parallel with and separated from, toward the opening edge, the front surface of the rack-like portion 24. Also, the lower end of the projecting piece 25 is connected to the lower end of the rack-like portion 24. The length of this projecting piece 25 is about half that of the rack-like portion 24, and by this projecting piece 25 and the front surface of the rack-like portion 24, an engaging groove 26 that opens to the left side and also toward the upper end is formed.

In the left side wall of the recessed area 19, at a position corresponding to the engaging groove 26, a slit 27 having almost same width and length as that of the engaging groove 26 is formed. Also, in the left side wall of the recessed area 19, a relatively large opening 28 that is connected to the upper side of the slit 27 is formed.

A partition wall 29 divides the lower right portion of the recessed area 19 in rectangular form, with transverse sides longer than the longitudinal sides, and this partition wall 29 is formed into a lying-down L-shape when viewed from the front. At a position closer to the upper end of a portion 29a of the partition wall 29, that extends in a vertical direction, a cutout 30 is formed. Furthermore, the portion of the bottom wall that is surrounded by the partition wall 29 and the side wall is removed to leave only the upper left side portion 31. In addition, from the front end of the lower half of the vertically extending portion 29a of the partition wall 29, a flat portion 32 extending to the right and left sides is formed. On the lower end portion of the wall on the right side of the partition wall 29, the portion facing the portion 29a of the partition wall 29 is cut out to leave only a small portion between this portion and the stepped portion 18 so that an opening 33 is formed there. In addition, in the right side wall of the recessed area 19, at a position that is in contact with the upper side of the horizontally (to the right and left sides) extending portion 29b of the partition wall 29, a slit 34 is formed.

In the lower left corner portion of the recessed area 19, a block-form portion 35 protruding to the front is formed. Also, from the upper end of a left side portion 32a of the flat portion 32, a wall 36 extending to the back is formed; and by the wall 36, the vertically extending portion 29a of the partition wall 29, and the right side wall of the block-form portion 35, a positioning recess 37 that opens upward and frontward is formed. An engaging recess 38 is formed in the foregoing wall 36 at a position closer to the back.

A first contact member 39 is made of a metal plate having electric conductivity. The contact member 39 is formed of an electric lamp holding portion for supporting one side of the base of a tubular lamp, a connecting piece, a locking piece and an engaging piece which are combined into a single unit.

A main portion 40 is shaped into crank-like form when viewed from the side. Its upper piece 40a and middle piece 40b are mostly housed in the positioning recess 37, and its lower piece 40c is placed on the front surface of the left side portion 32a of the flat portion 32. In the middle piece 40b, at a position closer to the upper piece 40a, an engaging pawl 41 is formed in a downwardly punched-out form. This engaging pawl 41 engages the engaging recess 38 formed in the wall 36.

An electric lamp holding portion 42 is formed integrally with the main portion 40 such that it extends upwardly from the upper end of the upper piece 40a of the main portion 40. From both the right and left side edges of the electric lamp holding portion 42, two holding pieces 43 are formed which protrude to the front. Also, along the mutually facing surfaces of the holding pieces 43, curved recesses 44 extending in a vertical direction are formed. The hollow portion between the curved recesses 44 receives the base of the electric lamp described later.

An engaging piece 45 is formed protruding to the right side from the right side edge of the upper end portion of the upper piece 40a of the main portion 40. Most of this engaging piece 45 is placed along a portion, closer to the bottom, on the upper surface of the portion 29b which extends rightward and leftward of the partition wall 29. Also, the front end of the engaging piece 45 is engaged with the slit 34 formed in the right side wall of the recessed area 19.

A connecting piece 46 that is closer to the upper piece 40a protrudes to the right side from a part of the right side edge of the middle piece 40b. The base portion of this connecting piece 46 is engaged with the cutout 30 formed in the vertically extending portion 29a of the partition wall 29.

A locking piece 47 is provided protruding to the right side edge of the lower piece 40c of the main portion 40 that is closer to the middle piece 40b, of length about two times that of the connecting piece 46. Also, an engaging claw 48 is formed by bending both sides of the front end portion of the locking piece 47 toward the front end at a right angle.

A second contact member 49 is made of a metal plate which is electrically conductive. A main portion 50 is formed such that its center area in the right and left directions is bent protrudingly toward the bottom side.

An electric lamp holding portion 51 protrudes upwardly from the center area in the right and left directions of the upper end of the main portion 50. Two holding pieces 52 protrude to the front from both the right and left side edges of the electric lamp holding portion 51. In the mutually facing surfaces of the holding pieces 52, two curved recesses 53 extending in a vertical direction are formed, and into the hollow portion between these curved recesses 53, the base of the electric lamp 60 to be described later is received.

A controlling piece 54 is provided such that it protrudes to the front from the upper end of the electric lamp holding portion 51.

An engaging piece 55 is formed protruding to the right side from nearly the center in a vertical direction of the right side edge of the main portion 50. This engaging piece 55 is engaged with the engaging groove 26 formed on the right side of the recessed area 19. An engaging pawl 56 is formed at a position above and close to the upper end of the projected piece 25 on the front surface of the rack-like portion 24, and the engaging piece 55 is engaged with the engaging groove 26 by the engaging pawl 56 to prevent the possible slipping of the engaging groove 26.

A connecting piece 57 is provided protruding to the left side from the left side edge of the main portion 50, and it is bent to form a crank-like shape when viewed in the vertical direction. Also, in the front end of this connecting piece 57, a through hole 58 for insertion is formed. Into this through hole 58 a supporting pin 59 protruding from the backside of the mirror body 11 is inserted.

Reference numeral 60 denotes an electric lamp in tubular form. One of the bases 61 provided on both ends of this electric lamp 60 is held between the holding pieces 43 of the electric lamp holding portion 42 of the first contact member 39; while the base 61 on the other side is held between the holding pieces 52 of the electric lamp holding portion 51 of the second contact member 49.

A lens 62 is formed having a size and shape that can be fitted in the recessed area 19, and its upper end surface is provided at the center with an engaging projection 63; while its lower end surface is provided at the center with an engaging pawl 64. By engagement of the engaging projection 63 with the engaging recess 22 and also by engagement of the engaging pawl 64 with the engaging recess 23, the lens 62 is mounted to the front frame 15 to cover the front face of the recessed area 19.

The cover 14 is formed of a shape and size to cover the entire area of the front surface of the front frame 15, and along one of its side edges, through an integrally formed hinge portion 66, a flat plate form fitting portion 67 is provided. In this fitting portion 67, small holes 68 are formed.

Holding pins 69 are provided protruding from positions along the lower edge of the backside of the front frame 15. By inserting the holding pins 69 formed in the front frame 15 into the small holes 68 formed in the fitting portion 67 of the cover 14, and by coupling push-on-fixers 70 (speed washers) with portions of the holding pins 69 which protrude from the small holes 68, the cover 14 is mounted to the front frame 15. Thereafter, by being rotated toward the front side of the front frame 15 from the hinge portion 66, the cover 14 is able to cover the front surface of the front frame 15.

Attracting pieces 71 made of magnetic material, such as iron, are fastened to positions close to both right and left sides in the portion closer to the rotating edge on the inner surface of the cover 14.

Permanent magnets 72 are disposed in recesses 73 formed on the backside of the upper portions close to both right and left sides of front frame 15. Yoke plates 74 are disposed to hold the permanent magnets 72 between them from the right and left sides, respectively, and their front end portions 74a slightly protrude from the front surface of the front frame 15.

When the cover 14 is positioned to cover the front surface of the front frame 15, the attracting pieces 71 provided on the cover 14 are on the front end portions 74a of the yoke plates 74 and attracted by them. Therefore, the cover 14 is maintained in the state of covering the front surface of the front frame 15. To use the mirror 12 by exposing the front surface of the front frame 15, the rotating end of the cover 14 is pulled toward the person facing the mirror against the attracting force of the permanent magnets 72 which attracts the attracting pieces 71 through the yoke plates 74.

A switch 75 turns on and off the electric lamp 60 in the lamp section 13 mentioned previously.

A cage or case 76 formed into a cylindrical shape with one end closed is made of synthetic resin. From the center portion of that closed end, a boss 77 protrudes toward the inside, and in this boss 77 an inserting through hole 78 is formed.

From the open end of the cage 76, slits 79 extending up to nearly midway toward the closed end side are formed. Also, at mutually facing positions along the opening end of the cage 76, cutouts 80 and 81 are formed. The cutout 80 is formed as a continuation in the open edge of one of the slits 79, and the other cutout 81 reaches nearly midway the distance up to the closed end side. Furthermore, at mutually facing positions close to the open end, engaging holes 82 are formed, staggered between the positions of the cutouts 80 and 81.

A conductor 83 is made of an electrically conductive metal plate. A terminal portion 84 is formed in the end portion on one side of the conductor 83. This terminal portion 84 is in the form of a disc with a diameter slightly smaller than the inside diameter of the cage 76, with an inserting through hole 85 formed in its center portion. Also, from the circumferential edge of terminal portion 84, small engaging pieces 86 are formed protruding therefrom. When these engaging pieces 86 are engaged with the engaging holes 82 formed in the cage 76 at positions close to the open edge of the cage 76, the terminal portion 84 is coupled to and placed in the cage 76 at a position near the open edge of the cage 76. In this state, the inserting through hole 85 formed in the center area of the terminal portion 84 corresponds to the inserting through hole 78 formed in the boss 7 of the case 76.

Walls 87 are erected at a position close to the location on the backside of the front frame 15 where the supporting pin 59 is erected. These walls 87 face each other with a space provided in between. The walls 87 have their mutually facing surfaces formed into concave curved surfaces when viewed from the rear, and between these curved surfaces a space with a cylindrical form having a diameter the same as the outside diameter of the cage 76 is formed. At positions in the foregoing space, which are opposite to each other, openings 88 are formed. At a position close to and outside of one of the openings 88, the supporting pin 59 is provided; while the other supporting pin 89 is erected at a location close to and outside of the opening 88 on the opposite side.

The portion adjacent to the terminal portion 84 of the conductor 83 is positioned inside of the cutout 80 formed along the open edge of the cage 76, and in a portion positioned outside of the cutout 80 an inserting through hole 90 is formed. When, after the supporting pin 89 is inserted to the inserting through hole 90, a push-on-fix 91 is coupled to the supporting pin 89, the conductor 83 is prevented from slipping off the supporting pin 89. Thus, the cage 76 is positioned between the walls 87. Also, on the front frame 15, at the center of the almost circular region between the walls 87, an inserting through hole 92 is formed, and this inserting through hole 92 is positioned to be aligned on the same axis as the inserting through hole 85 of the terminal portion 84 of the conductor 83 with the inserting through hole 78 of the boss 77 of the cage 76.

A connecting piece 93 is formed in the other end portion of the conductor 83, and its base portion is engaged with a cutout 94 formed at the rear edge of a vertically extending portion 29a of the partition wall 29 at the position slightly lower than the cutout 30. Most of the connecting piece 93 is placed in line with the connecting piece 46 in a space 95 surrounded by the partition wall 29 and the lower right side portion of the side wall of the recessed area 19.

A connecting terminal 96 is made of an electrically conductive metal plate. This connecting terminal 96 is integrally formed of a middle portion 97 in a crank-like form when viewed from the side, a fitting portion 98 bent perpendicularly from one end of the middle portion 97, and a terminal portion 99 bent perpendicularly from the other end of the middle portion 97 in a direction opposite to the fitting portion 98. At the center portions of the fitting portion 98 and the terminal portion 99, inserting through holes 98a and 99a are formed, respectively.

Then, the terminal portion 99 of the connecting terminal 96 is inserted into the cage 76 through the cutout 81; and into its inserting through hole 99a, the boss 77 is inserted. Also, into the inserting through hole 98a, the supporting pin 59 is inserted and then, from above the fitting portion 98, a push-on-fix 100 is engaged with the supporting pin 59. As a result, the fitting portion 98 of the connecting terminal 96 and the connecting piece 57 of the second contact member 49 become connected by the supporting pin 59 overlapping each other. With such an arrangement, the second contact member 49 and the connecting terminal 96 are connected electrically.

An operating pin 101 is made of synthetic resin and to its middle portion a flange 102 made of an electrically conductive metal plate is fixed. Then, the portion of this operating pin 101 located on the back side relative to the flange 102 is inserted slidably into the inserting through hole 78 formed in the boss 77 of the cage 76; while the portion on the front side relative to the flange 102 is inserted into the inserting through hole 92 formed in the front frame 15 through the inserting through hole 85 formed in the terminal portion 84 of the conductor 83.

A coil spring 103 also made of a material having electrical conductivity is inserted over boss 77 of cage 76 as well as over the portion of the operating pin 101 that is located on the back side relative to the flange 102 in a compressed state between the flange 102 and the closed end of the cage 76.

When the operating pin 101 is not pushed from the front side, the spring force of the coil spring 103 act on the flange 102 to contact the terminal portion 84 of the conductor 83, and causes the front end of the operating pin 101 to protrude from the front surface of the front frame 15 by passing through the inserting through hole 92. In this configuration, electricity runs through the conductor 83, the flange 102, the coil spring 103, the connecting 96, the second contact member 49, the electric lamp 60 and the first contact member 39. But when the front end of the operating pin 101 is pushed by the cover 14 against the spring force of the coil spring 103, the flange 102 is separated from the terminal portion 84 of the conductor 83. As a result, the above described electric circuit is opened.

When the cover 14 is opened, the front end of the operating pin 101 sticks out of the front surface of the front frame 15 and the switch 75 closes. When the cover 14 is closed, the front end of the operating pin 101 is pushed by the cover 14 and moved backward, thereby causing the switch 75 to open the circuit.

Also, the connecting piece 46 and the locking piece 47 of the first contact member 39, the connecting piece 93 of the conductor 83, the space 95, and the opening 36 form an internal connector 104.

L-shaped engaging pieces 105 protrude from positions close to the right side edge of the backside of the front frame 15 with their tips turned toward the outside, that is, to the right side. These engaging pieces 105 are engaged with the supporting bracket 7 of the sun visor 1, and by inserting through holes 20 formed in the recessed area 19 of the front frame 15, set screws 106 are screwed into the tapped holes 9 of the supporting bracket 8 of the sun visor 1. In this manner, the front frame 15 of the vanity mirror 10 is mounted into the recessed area 6 of the sun visor 1.

An external connector 107 comprises a case 108 made of synthetic resin, connecting pieces (not shown in the Figures) and cords 109 connected to the connecting pieces led out from the rear end of case 108 and then connected to a power source (not shown in the Figures). The case 108 has a size and shape which allows it to be inserted snugly in space 95 of the internal connector 104 formed in the vanity mirror 10, with the rear end portion protruding from space 95. Also, an engaging piece 110 with an engaging hole 110a is formed integrally with the case 108 on a surface of one side of the rear end portion of the case 108.

The case 108 of the external connector 107 is inserted from its front end into the space 95 of the internal connector 104 through the opening 33. Then, the connecting pieces 46 and 93 of the internal connector 104 are connected to the connecting pieces (not shown in the Figures) and placed in the case 108 of the external connector 107. Also, the engaging pawl 48 at the front end of the locking piece 47 is engaged with the engaging hole 110a provided in the engaging piece 110 of the external connector 107. As a result, inadvertent slipping out of the external connector 107 from the internal connector 104 is prevented.

As should be apparent from the description given above, the vanity mirror with lamp according to this invention provides the following characteristic features. A lamp section comprises a tubular electric lamp in a recessed area formed in the mirror body; in the recessed area two contact members for supporting the bases on both ends of the electric lamp are disposed; at one of each end of those contact members the electric lamp holding portions are formed; the other end of at least one of the contact members is formed into a connecting piece to which the external connector is connected; and the internal connector is formed by disposing the connecting piece connected to the other end of the other contact member so as to be in parallel with the connecting piece of the first contact member.

Accordingly, the vanity mirror with lamp provided by this invention does not use the vehicle body as a ground and it is therefore unnecessary to use electrically conductive material for the supporting brackets which support the body and other parts of the vanity mirror of the sun visor. It therefore is possible to form most of the sun visor structure using lightweight material such as synthetic resins. As a result, the sun visor with the vanity mirror with lamp can be reduced in weight. Furthermore, since an internal connector is provided, the wires for the power supply and ground do not hang, thereby eliminating cumbersome handling during maintenance, storage and transportation. In addition, the power source can be connected merely by connecting the external connector to the internal connector. Consequently, the work required to mount the vanity mirror with lamp to the vehicle body can be simplified substantially.

What is claimed:

1. A vanity mirror with lamp mountable on a vehicle sun visor, said vanity mirror characterized in that:
   a housing and an external connector are provided in the sun visor;
   said housing has a recessed area which accommodates the vanity mirror and an adjacent lamp section;
   said lamp section is formed with a tubular electric lamp having bases on both sides of the lamp;
   said recessed area comprises a first and a second contact member each with two ends for holding the bases on both sides of the electric lamp;
   said first and second contact members comprise electric lamp supporting portions formed at one end of the first contact member and at one end of the second contact member;
   the other end of at least one of said contact member is formed into a first connecting piece to which said external connector is connected;
   an internal connector is formed by disposing a second connecting piece connected to the other end of the second contact member, in parallel with the first connecting piece;
   said first contact member comprises:
      a main portion formed into a crank-like form when viewed from a side, said main portion comprising:
         an upper portion and a middle portion for being housed in a positioning recess in said housing;
         a lower portion for lying along a flat portion of said housing; and
         an engaging pawl formed on said middle portion for engagement with an engaging recess in said housing;
      an electric lamp holding portion formed integrally with said main portion which includes a pair of lamp holding portions projecting in parallel therefrom;
      an engaging portion formed integrally with the main portion, said engaging portion comprising:
         an engaging piece projecting from a right side edge of said upper portion of said main portion and engaging with a slit formed in the housing;
         a connection piece projecting from a right side edge of said middle portion of said main portion and projecting through a cut out in said housing;
         a locking piece projecting from a right side edge of the lower portion of the main portion, said locking piece being substantially twice as long in length as said connecting piece; and
         an engaging claw formed on a projection end of said locking piece;
   said second contact member comprises:
      a main portion formed such that a center area thereof in right and left directions protrudes toward a bottom side;
      an electric lamp holding portion formed integrally with said center area and comprising a pair of lamp holding portions projecting in parallel therefrom;
      a control piece projecting to the front from an upper end of the electric lamp holding portion;
      an engaging piece projecting to the right side from substantially a center in a vertical direction of a right side edge of the main portion of the second contact member and engaging with an engaging groove formed in said housing; and a connecting piece projecting to a left side edge of the main portion, said connecting piece being formed in a crank-like shape when viewed in a vertical direction and for coupling said second contact member to said housing.

2. The vanity mirror with lamp according to claim 1, wherein the mirror body and lamp section are made of lightweight materials.

3. The vanity mirror with lamp according to claim 1, wherein the lightweight materials are synthetic resins with the exception of the materials used for parts carrying electric current.

4. A vanity mirror with lamp according to claim 3, wherein the first connecting piece is formed from the other end of the first contact member.

5. A vanity mirror mounted on a vehicle sun visor, said vanity mirror characterized in that:

a housing having a recessed area which receives the vanity mirror and an adjacent lamp section is provided;

said lamp section is formed with a tubular electric lamp having a base on both ends of the lamp;

said recessed area receives first and second contact members with one end of each of said first and second contact members being formed integrally into two spaced apart lamp holding pieces for electrically connecting with and clamping therebetween said base of the electric lamp, said first contact member comprising:

a main portion being formed into a crank-like form when viewed from a side and having an upper portion, a middle portion and a lower portion, said upper and middle portions being adapted to be housed in a positioning recess in said housing, and said middle portion having an engaging pawl for engaging with an engaging recess in said housing;

an electric lamp holding portion formed on said main portion and including a pair of lamp holding pieces;

an engaging piece projecting from a right side edge of said upper portion of the main portion for engaging with a slit formed in the housing;

a connecting piece projecting from the right side edge of said middle portion for projecting through a cutout in said housing; and a locking piece projecting from the right side edge of the lower portion of the main portion with the length substantially twice that of the connecting piece and having an engaging claw on the projecting end; and the other end of the first contact member is formed integrally into a first connecting piece which is connected to one of two terminals of an external connector;

the other end of the second contact member is connected to a second connecting piece; and said second connecting piece is mounted on the housing to be parallel to the first connecting piece and said second connecting piece is connected to the other terminal of said external connector.

6. A vanity mirror as set forth in claim 5, wherein said second contact member comprises:

a main portion formed such that a sensor area in the left and right directions thereof protrudes toward the bottom side;

an electric lamp holding portion including a pair of lamp holding pieces;

a control piece projecting to the front from an upper end of the electric lamp holding portion;

an engaging piece projecting to the right side from substantially a vertical center of the right side edge of the main portion for engaging with an engaging groove in said housing; and a connecting piece projecting from the left side edge of the main portion and formed into a crank-like shape as viewed in the vertical direction.

* * * * *